Figure 1:
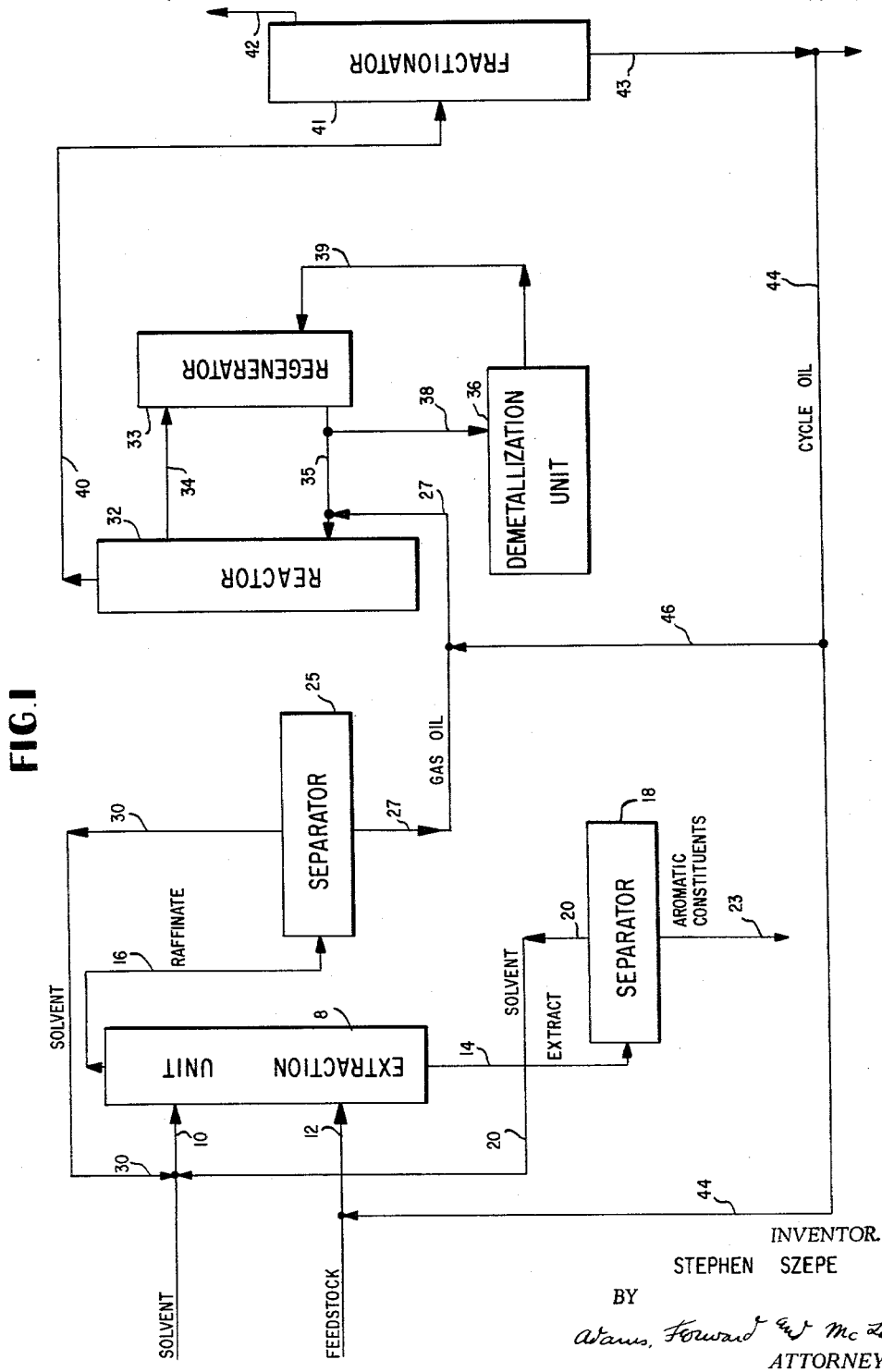

Dec. 22, 1964  S. SZEPE  3,162,595
CRACKING OF HEAVY HYDROCARBONS
Filed June 5, 1962  2 Sheets-Sheet 1

INVENTOR.
STEPHEN SZEPE
BY
*Adams, Forward and McLean*
ATTORNEYS

3,162,595
CRACKING OF HEAVY HYDROCARBONS

Stephen Szepe, Chicago, Ill., assignor to Sinclair Research, Inc., Wilmington, Del., a corporation of Delaware
Filed June 5, 1962, Ser. No. 200,210
8 Claims. (Cl. 208—87)

This invention is a hydrocarbon conversion process by which highly decreased coke yields and greater efficiency in gasoline production may be experienced. Particularly, the process of this invention minimizes coke production to produce improved results by cracking gasoil feedstocks which have been treated by solvent extraction to remove aromatic components, the primary coke-formers in cracking operations, and by removing metal contaminants from the catalyst. In conventional catalytic cracking operations which use distillate, lightly metals-contaminated, gas-oils, the coke-burning operation involves a great amount of equipment and expense. In this invention the amount of coke produced from a conventional feedstock may be reduced, or less desirable and, therefore, cheaper, feedstocks may be employed.

Catalytically promoted cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1050° F., preferably about 850 to 975° F., at pressures up to about 100 p.s.i.g., preferably about atmospheric to 5 to 15 p.s.i.g., and advantageously without substantial addition of free hydrogen to the system. In the cracking operation a batch, semi-continuous or continuous system may be used but most often is a continuous fluidized system.

The cracking catalyst is of the solid refractory metal oxide type known in the art, for instance silica, alumina, magnesia, titania, etc., or their mixtures. Of most importance are the synthetic gel-containing catalysts, such as the synthetic and the semi-synthetic, i.e., synthetic gel supported on a carrier such as natural clay, cracking catalysts. The cracking catalysts which have received the widest acceptance today are usually predominantly silica, that is silica-based, and may contain solid acidic oxide promoters, e.g., alumina, magnesia, etc., with the promoters usually being less than about 50% of the catalyst, preferably about 5 to 25%. These compositions are calcined to a state of very slight hydration. The cracking catalyst can be of macrosize, for instance bead form, or finely divided form, and employed as a fixed, moving or fluidized bed. In a highly preferred form of this invention finely divided (fluid) catalyst, for instance having particles predominantly in the 20 to 150 micron range, is disposed as a fluidized bed in the reaction zone to which the feed is charged continuously and is reacted essentially in the vapor phase.

Vaporous products are taken overhead and a portion of the catalyst is continuously withdrawn and passed to a regeneration zone where coke or carbon is burned from the catalyst, generally in a fluidized bed, by contact with a free oxygen-containing gas before its return to the reaction zone. In a typical operation the catalytic cracking of the hydrocarbon feed would normally result in the conversion of about 40 to 70%, preferably about 50 to 60%, of the feedstock into a product boiling in the gasoline range. The effluent from the cracker conveniently is distilled to isolate the gasoline fraction. Also, products, such as fixed gases, boiling below the gasoline range are removed from the system.

Cracking has, as its main purpose, the reduction in size of long-chain molecules of the feedstock to give products boiling in the gasoline range. Two measures of efficiency are noted in such catalysts. Activity is a measure of the ability of a catalyst to convert a feedstock to lighter products; selectivity is a measure of the ability of the catalyst to crack the feedstock to the desired products such as gasoline. Some metals on the catalyst contribute greatly to the loss of selectivity, and the lack of selectivity in the catalyst contributes greatly to the formation of coke.

In cracking, the feedstock is usually a mineral oil or petroleum hydrocarbon fraction such as straight run or cracked gas oil or other normally liquid hydrocarbon mixture boiling above the gasoline range. As is well-known to those familiar with the art, gas oil is a broad, general term that covers a variety of stocks. The term, for instance, includes any fraction distilled from petroleum which has an initial boiling point of at least about 400° F. and an end boiling point of at least about 600° F., and boiling over a range of at least about 100° F. The portion which is not distilled is considered residual stock. The exact boiling range of a gas oil, therefore, will be determined by the initial distillation temperature (initial boiling point) and by the temperature at which distillation is cut off (end boiling point). In practice, petroleum distillations have been made under vacuum up to temperatures as high as about 1100–1200° F. (corrected to atmospheric pressure). Accordingly, in the broad sense, a gas oil is a petroleum fraction which boils essentially between two temperatures that establish a range falling within from about 400° F. to about 1100–1200° F. Thus, a gas oil could boil over the entire range 400–1200° F. or it could boil over a narrower range, e.g., 500–900° F.

A gas oil can be further roughly classified by boiling ranges. Thus, gas oil boiling between about 400° F. and about 600–650° F. is termed a light gas oil; a medium gas oil distills between about 600–650° F. and about 800–900° F.; a gas oil boiling between about 800–850° F. and about 1100–1200° F. is sometimes designated as a vacuum gas oil. It must be understood, however, that a particular stock may bridge two boiling ranges, or even span several ranges, i.e., include, for example, light and medium gas oils.

In recent times, a great deal of effort has been applied in petroleum refining to increase recovery of catalytic cracking feedstock or "gas oils" from residual fractions of petroleum oil, but attempts to employ heavier fractions of crude oil for catalytic cracking have been limited heretofore due to the heavy coke laydowns experienced in cracking such feedstocks. Coke build-up in catalytic cracking is caused by a number of factors not necessarily independent of each other. The presence of high-boiling aromatics and other hydrocarbon coke-formers in the feed and, as mentioned, lack of selectivity in the catalyst contribute greatly to excess coke formation. In high boiling feedstocks both of these problems are more severe since these fractions contain higher proportions than conventional gas-oil feedstocks of coke formers and metal contaminants, which diminish the selectivity of the catalyst. The higher boiling fractions of many crude oils contain substantial portions of metal contaminants, particularly nickel and vanadium components perhaps present in quantities of about 1 to 50 pounds of metal per 1000 barrels of oil. These metals are present to some extent even in conventional light gas oil feedstocks and deposit in a relatively non-volatile form on the catalyst during the conversion processes so that regeneration of the catalyst to remove coke does not remove these contaminants. Although referred to as "metals," these catalyst contaminants may be in the form of free metals or relatively non-volatile metal compounds. It is to be understood that the term "metal" used herein refers to either form. Catalyst poisoning damages the selectivity of a cracking catalyst, causing the catalyst to convert hydrocarbons in the feed to hydrogen and coke rather than the desired light hydrocarbon product. In some commercial operations coke production frequently becomes so severe, due to catalyst poisoning, as well as coke-formers in the feed, that the feed rate or conversion must be reduced to maintain operations within the unit limitations. It is to be understood, therefore, that the problems of catalyst contamination and coke formation prevent full exploitation of heavy feeds. Charge stocks containing more than about 1.5 parts per million of vanadium and/or about 0.6 part per million of nickel are generally avoided in catalytic cracking, and most refiners prefer a gas oil having less than about 0.5 p.p.m. of vanadium, and less than about 0.2 p.p.m. of nickel.

Conventional gas oil feedstocks as well as the heavier stocks contain significant amounts of aromatic components as well as metal contaminants, and contaminating metals may contribute up to about 30% to the choke formation on the catalyst. While the aromatic constituents in the gas oil may be the primary coke precursors in the feedstock, the process of this invention enables cracking units handling such conventional gas oils to operate with smaller coke removal facilities. If these coke-formers are substantially removed from the system, the catalytic cracking operation will be more efficient, and there will be less need for catalyst replacement.

It is an object of the present invention to lessen the expense of the carbon removal cycle by providing an integrated process for the treatment of gas oil feedstocks, in which the steps of coke precursor removal by solvent extraction, catalytic cracking, and catalyst demetallization are combined and adjusted to minimize the yield of low value products and to maximize the yields of high quality products such as high octane gasoline, by-product aromatics for use in petro chemical processes, and other valuable constituents.

As mentioned previously, the distillate fraction conventionally used as a cracking feedstock is that boiling in the range between about 400° F. to about 1000° F. The process of this invention can be applied effectively to feedstocks of the conventional type and is advantageous with heavy distillates, those boiling between about 800 to 850° F. and 1200° F. or higher.

The charge stocks contain metals which are poisonous to the cracking catalyst. The process of this invention, with its demetallization features, is economically attractive for feedstocks containing as little as about 0.3 p.p.m. nickel, and/or about 1.2 p.p.m. vanadium. In the process of this invention metal contents above these ranges may be present; it will be apparent that oils having metal and coke-forming contents in these generally undesirable ranges are the oils which this invention salvages. A mixture of vanadium and nickel may be considered as harmful as a single metal even though the individual amounts of each metal are below the values mentioned above because the effect of the total amount of the metallic components is frequently sufficient to give harmful effects during catalytic cracking.

As mentioned, the processing procedure of this invention incorporates several processing improvements which make it considerably more attractive to crack heavier distillate stocks. Also, one may apply this extraction operation to the recycle oil from the cracker effluent fractionator. The deleterious effects of catalyst deactivating carbon or coke deposits are overcome to a great extent by combining solvent extraction with one or more of the demetallization procedures hereinafter described. This permits extracting and cracking a greater percentage of metal contaminated gas oils without discarding large amounts of expensive cracking catalyst in order to keep metals level low, or burning large amounts of coke deposits.

Removal of aromatics is performed by solvent extraction to give an extract phase containing solvent and aromatic components and a raffinate gas oil phase which is used as a cracking feedstock. The solvent used in the extraction process may be one of a group of solvents selective for the separation of paraffinic and aromatic fractions such as phenol, furfural, liquid sulfur dioxide and the like. Extraction is generally conducted countercurrently in a tower.

The conditions under which the extraction tower may be operated can be any of those conventional in the art as, for example, temperatures generally in the range of from about 100 to 300° F. with a temperature gradient through the tower of about 0 to 50° F. and solvent-to-oil ratios of from about 0.5 to 6:1 and preferably about 1 to 3:1. Normal operating pressures should be higher than the vapor pressure of the solvent system used at the temperature of operation. For example, in a solvent system comprising phenol, pressures within the range of about 150 to 300 p.s.i.g. may be used. The invention may be carried out in a plurality of stages in one vessel or in a plurality of vessels in series. The separate stages may be conducted with a temperature gradient and pressure gradient between the stages. The two phases are separately withdrawn; the aromatic hydrocarbons are removed from the extract as desired; and the gas oil is then used as a feedstock to a catalytic cracking operation.

The solvent extraction step of this invention, as pointed out above, removes from the feedstock treated the aromatic components as an extract phase. This phase is conducted to a zone where, for example, by a pressure and/or temperature change the solvent is vaporized leaving higher boiling aromatics which may be used as a raw material for various petro-chemical processes. The raffinate phase comprises a liquid gas oil substantially free of coke-formers suitable for use in this process as a catalytic cracking feedstock. Traces of solvent in the raffinate may be removed by vaporization as was performed in the extract phase.

The recovered gas oil is then subjected to catalytic cracking. Contaminating metals in greater quantities than are acceptable to the art generally are present in the cracker feedstock, for instance in amounts of at least 1.0 p.p.m. The amounts of the contaminating metals in the gas oil feedstocks are as little as about 0.3 p.p.m. nickel and/or about 0.8 p.p.m. vanadium, but can be up to about 3 p.p.m. nickel and/or about 5 p.p.m. vanadium. In cracking, coke yield may be further held to a minimum through the use of good steam stripping and a high steam partial pressure.

Regeneration of a catalyst to remove carbon is a relatively quick procedure in most commercial catalytic conversion operations and usually will be even quicker using the procedures of this invention. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about 1–2%. The regeneration of any particular quantum of catalyst is generally regulated to give a carbon content of less than about 1.0%, generally less than about 0.5%. Regeneration puts the catalyst in a substantially carbon-free state, that is, the state where little, if any, carbon is burned or oxygen consumed even when the catalyst is contacted with oxygen at temperatures conducive to combustion.

In the treatment to take poisoning metals from the cracking catalyst the amount of metal is removed which is necessary to keep the average metal content of the catalyst in the cracking system below the limit of the unit's tolerance for poison. The tolerance of the cracker for poison in turn determines to a large extent the amount of metals removed in the catalyst demetallization procedure. Where the catalyst contains a greater amount of poisoning metal, a particular treatment will remove a greater amount of metal, for example, if the cracker can tolerate an average of 100 p.p.m. Ni and the demetallization process can removed 50% of the nickel content of the catalyst, only 50 p.p.m. of nickel can be removed in a pass through the catalyst demetallization system. However, where the cracker can tolerate 500 p.p.m. of nickel, it is possible to remove 250 p.p.m. nickel from the catalyst with each pass through the demetallization system. It is advisable, therefore, to operate the cracking and demetallization procedures with a catalyst having a metals content near the limit of tolerance of the cracker for poisoning metals. This tolerance for poisoning metal oxide is seldom greater than about 5000–10,000 p.p.m. Catalyst demetallization is not economically justified unless the catalyst contains at least about 50 p.p.m. and/or 50 p.p.m. vanadium. Preferably the equilibrium metals level is allowed to exceed about 200 p.p.m. nickel and/or 500 p.p.m. vanadium so that the total metals removal will be greater per pass through the demetallizer.

In the treatment to take poisoning metals from the cracking catalyst a large or small amount of metal can be removed as desired. The demetallization treatment generally removes about 10 to 90% of one or more poisoning metals from a catalyst portion which passes through the treatment. Preferably a demetallization system is used which removes about 60 to 90% nickel and 20–40% vanadium from the treated portion of catalyst. Preferably at least 50% of the equilibrium nickel content and 15% of the equilibrium vanadium content is removed. The actual time or extent of treating depends on various factors, and is controlled by the operator according to the situation he faces, e.g., the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison. In a continuous operation of the commercial type a satisfactory treating rate may be about 5 to 50% of the total catalyst inventory in the system, per twenty-four hour day of operation although other treating rates may be used. With a continuously circulating catalyst stream, such as in the ordinary "fluid" system a slip-stream of catalyst, at the "equilibrium" level of poisoning metals may be removed intermittently or continuously from the regenerator standpipe of the cracking system. The catalyst is subjected to one or more of the demetallization procedures described hereinafter and then the catalyst, substantially reduced in contaminating metal content, is returned to the cracking system.

The demetallization of the catalyst will generally include one or more processing steps. Copending patent applications Serial Nos. 758,681, filed September 3, 1958; 763,833, and 763,834, filed September 29, 1958; 767,794, filed October 17, 1958; 842,618, filed September 28, 1959; 849,119, filed October 28, 1959; 19,313, filed April 1, 1960; 39,810, filed June 30, 1960; 47,598, filed August 4, 1960; 53,380, filed September 1, 1960; 53,623, filed September 2, 1960; 54,368, 54,405 and 54,532, filed September 7, 1960; 55,129, 55,160 and 55,184, filed September 12, 1960; 55,703, filed September 13, 1960; 55,838, filed September 14, 1960; 67,318, filed November 7, 1960; 73,199, filed December 2, 1960; and 81,256 and 81,257, filed January 9, 1961; all of which are hereby incorporated by reference, describe procedures by which vanadium and other poisoning metals included in a solid oxide hydrocarbon conversion catalyst are removed by dissolving them from the catalyst or subjecting the catalyst, outside the hydrocarbon conversion system, to elevated temperature conditions which put the metal contaminants into the chloride, sulfate or other volatile, water-dispersible or more available form. A significant advantage of these processes lies in the fact that the overall metals removal operation, even if repeated, does not unduly deleteriously affect the activity, selectivity, pore structure and other desirable characteristics of the catalyst.

Treatment of the regenerated catalyst with molecular oxygen-containing gas may be employed to improve the removal of vanadium from the poisoned catalyst. This treatment is described in copending application Serial No. 19,313 and is preferably performed at a temperature at least about 50° F. higher than the regeneration temperature, that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characteristics, preferably a temperature of about 1150 to 1350° or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high-temperature treatment, the essential oxygen contact is that continued after carbon removal, which may vary from the short time necessary to produce an observable effect in the later treatment, say, a quarter of an hour to a time just long enough not to damage the catalyst. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over and above that which would have been obtained by the other metals removal steps without the oxygent treatment. The maxiumum practical time of treatment will vary from about 4 to 24 hours, depending on the type of equipment used. The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air, containing at least about 1%, preferably at least about 10% $O_2$. The partial pressure of oxygen in the treating gas may range widely, for example, from about 0.1 to 30 atmospheres, but usually the total gas pressure will not exceed about 25 atmospheres.

The catalyst may pass directly from the oxygen treatment to a vanadium removal treatment especially where this the only important contaminant, as may be the case when a feed is derived, for example, from Venezuelan crude. Such treatment may be a basic aqueous wash such as described in copending patent applications Serial No. 767,794, and Serial No. 39,810. Alternatively, vanadium may be removed by a chlorination procedure as described in copending application Serial No. 849,199.

Vanadium may be removed from the catalyst after the high temperature treatment with molecular oxygen-containing gas by washing it with a basic aqueous solution. The pH is frequently greater than about 7.5 and preferably the solution contains ammonium ions which may be $NH_4^+$ ions or organic-substituted $NH_4^+$ ions such as methyl ammonium and quaternary hydrocarbon radical ammoniums. The amount of ammonium ion in the solution is sufficient to give the desired vanadium removal and will often be in the range of about 1 to 25 or more pounds per ton of catalyst treated. The temperature of the wash solution may vary within wide limits: room temperature or below, or higher. Temperatures above 215° F. require pressurized equipment, the cost of which does not appear to be justified. Very short contact times, for example, about a minute, are satisfactory, while the time of washing may last 2 to 5 hours or longer. After the ammonium wash the catalyst slurry can be filtered to give a cake which may be reslurried with water or rinsed in other ways, such as, for example, by a water wash on the filter, and the rinsing may be repeated, if desired, several times.

Alternatively, after the high temperature treatment with oxygen-containing gas, treatment of a metals contaminated catalyst with a chlorinating agent at a moderately elevated temperature up to about 1000° F. is of value in removing vanadium from the catalyst as volatile chlorides. This treatment is described in copending application Serial No. 849,199. The chlorination takes place at a temperature of at least about 300° F., preferably about 550 to 650° F. with optimum results usually being obtained near 600° F. The chlorinating agent is essentially anhydrous, that is, if changed to the liquid state no separate aqueous phase would be observed in the reagent.

The chlorinating reagent is a vapor which contains chlorine or sometimes HCl, preferably in combination with carbon or sulfur. Such reagents include molecular chlorine but preferably are mixtures of chlorine with, for example, a chlorine-substituted light hydrocarbon, such as carbon tetrachloride, which may be used as such or formed in situ by the use of, for example, a vaporous mixture of chlorine gas with low molecular weight hydrocarbons such as methane, n-pentane, etc. About 1 to 40% active chlorinating agent based on the weight of the catalyst is generally used. The carbon or sulfur compound promoter is generally used in the amount of about 1 to 5 or 10% or more, preferably about 2 to 3%, based on the weight of the catalyst, for good metals removal; however, even if less than this amount is used, a considerable improvement in metals conversion is obtained over that which is possible at the same temperature using chlorine alone. The chlorine and promoter may be supplied individually or as a mixture to a poisoned catalyst. Such a mixture may contain about 0.1 to 50 parts chlorine per part of promoter, preferably about 1 to 10 parts per part of promoter. A chlorinating gas comprising about 1 to 30 weight percent chlorine, based on the catalyst, together with 1% or more $S_2Cl_2$ gives good results. Preferably, such a gas provides 1 to 10% $Cl_2$ and about 1.5% $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$ to 5–10 parts $Cl_2$ or HCl. Conveniently, a pressure of about 0 to 100 or more p.s.i.g., preferably about 0 to 15 p.s.i.g., may be maintained in chlorination. The chlorination may take about 5 to 120 minutes, more usually about 20 to 60 minutes, but shorter or longer reaction periods may be possible or needed, for instance, depending on the linear velocity of the chlorinating and purging vapors.

The demetallization procedure employed in this invention may be directed toward nickel removal from the catalyst, generally in conjunction with vanadium removal. Nickel removal may be accomplished by dissolving nickel compounds directly from the catalyst and/or by converting the nickel compounds to volatile materials and/or materials soluble or dispersible in an aqueous medium, e.g., water or dilute acid. The water-dispersible form may be one which decomposes in water to produce water-soluble products. The removal procedure for the converted metal may be based on the form to which the metal is converted. The mechanism of the washing steps may be one of simultaneous conversion of nickel and/or vanadium to salt form and removal by the aqueous wash; however, this invention is not to be limited by such a theory.

Conversion of some of the metal poisons, especially nickel, to a water-dispersible form may be as described in copending application Serial No. 758,681, that is, by subjecting the catalyst to a sulfating gas, that is $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure, described in copending applications S.N. 763,834 and S.N. 842,618, includes sulfiding the catalyst and performing an oxidation process, after which metal contaminants in water-dispersible form, preferably prior to an ammonium wash, may be removed from the catalyst by an aqueous medium.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g., batch or continuous, as well as the rate of diffusion within the catalyst matrix. The sulfiding step performs the function not only of supplying a sulfur-containing metal compound which may be easily converted to a water-dispersible form but also appears to concentrate some metal poisons, especially nickel, at the surface of the catalyst particle.

Oxidation after sulfiding may be performed by a gaseous oxidizing agent to provide metal poisons in a dispersible form. Gaseous oxygen, or mixtures of gaseous oxygen with inert gases such as nitrogen, may be brought into contact with the sulfided catalyst at an oxygen partial pressure of about 0.2 atmosphere and upward, temperatures upward of room temperature and usually not above about 1300° F., and times dependent on temperature and oxygen partial pressure. Gaseous oxidation is best carried out near 900° F., about one atmosphere $O_2$ and at very brief contact times.

The metal sulfide may be rendered water-dispersible by a liquid aqueous oxidizing agent such as a dilute hydrogen peroxide or hypochlorous acid water solution, as described in copending application Serial No. 842,618. The inclusion in the liquid aqueous oxidizing solution of sulfuric acid or nitric acid has been found greatly to reduce the consumption of peroxide. In addition, the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst.

A 30% $H_2O_2$ solution in water seems to be an advantageous raw material for preparing the aqueous oxidizing solution. Sodium peroxide or potassium peroxide may be used in place of hydrogen peroxide and in such circumstances, extra sulfuric or nitric acid may be used.

Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. Varying oxygen partial pressure in the range of about 0.2 to 1.0 atmosphere appears to have no effect on the time required for oxidation, which is generally at least about 7 to 8 minutes. The oxidizing slurry may contain about 20% solids and provide about 5 pounds of nitric acid per ton of catalyst. Studies have shown a greater concentration of $HNO_3$ to be of no significant advantage. Other oxidizing agents, such as chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will provide a dispersible form. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

After conversion of nickel sulfite to a dispersible form, the catalyst is washed with an aqueous medium to remove the metal poisons. This aqueous medium, for best removal of nickel, is generally somewhat acidic, and this condition may be brought about, at least initially, by the presence of an acid-acting salt or some entrained acidic oxidizing agent on the catalyst. The aqueous medium can contain extraneous ingredients in trace amounts, so long as the medium is essentialy water and the extraneous ingredients do not interfere with demetallization or adversely affect the properties of the catalyst. Ambient temperatures can be used in the wash but temperatures of about 150° F. to the boiling point of water are sometimes helpful. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from a chlorinated catalyst, contact time in this stage is preferably held to about 3 to 5 minutes which is sufficient for nickel removal. Also, since a slightly acidic solution is desirable for nickel removal, this wash preferably takes place before the ammonium wash.

Alternative to the removal of poisoning metals by procedures involving contact of the sulfided or sulfated catalyst with aqueous media, nickel poison may be removed through conversion of the nickel sulfide to the volatile nickel carbonyl by treatment with carbon monoxide, as described in copending application Serial No. 47,598. In such a procedure the catalyst is treated with hydrogen at an elevated temperature during which nickel contaminant is reduced to the elemental state, then treated, preferably under elevated pressure and at a lower temperature with carbon monoxide, during which nickel carbonyl is formed and flushed off the catalyst surface. Hydrogenation takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state. Carbonylation takes place at a temperature substantially lower than the hydrogenation, from about ambient temperature to 300° F. maximum and at a pressure up to about 2000 p.s.i.g., with a gas containing about 50 to 100 mole percent CO. Preferred conditions include greater than about 90 mole percent CO, a pressure of up to about 800 p.s.i.g. and a temperature of about 100 to 180° F. The CO treatment serves generally both to convert the elemental metals, especially nickel, to volatile carbonyls and to remove the carbonyls.

After the ammonium wash, or after the final treatment which may be used in the catalyst demetallization procedure, the catalyst is conducted back to the cracking system. Where a small amount of the catalyst inventory is demetallized, the catalyst may be returned to the cracking system, preferably to the regenerator, as a slurry in its final aqueous treating medium. Where a large amount of catalyst inventory is treated, lest the water unduly lower the temperature in the regenerator, it may be desirable first to dry a wet catalyst filter cake or filter cake slurry at, say, about 250 to 450° F. and also, prior to reusing the catalyst in the cracking operation it can be calcined, say at temperatures usually in the range of about 700 to 1300° F. Prolonged calcination of the catalyst at above about 1100° F. may sometimes be disadvantageous. Calcination removes free water, if any is present, and perhaps some but not all of the combined water, and leaves the catalyst in an active state without undue sintering of its surface. Inert gases such as nitrogen frequently may be employed after contact with reactive vapors to remove any of these vapors entrained in the catalyst or to purge the catalyst of reaction products.

The demetallization procedure of this invention has been found to be highly successful when used in conjunction with fluidized catalytic cracking systems to control the amount of metal poisons on the catalyst. When such catalysts are processed, a fluidized solids technique is recommended for these vapor contact demtallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depoisoned catalyst, although further metals content may be removed by repeated or other treatments.

This invention will be better understood by reference to the drawings. It is to be understood that the particular apparatus described is illustrative only and not limiting.

Figure 2:
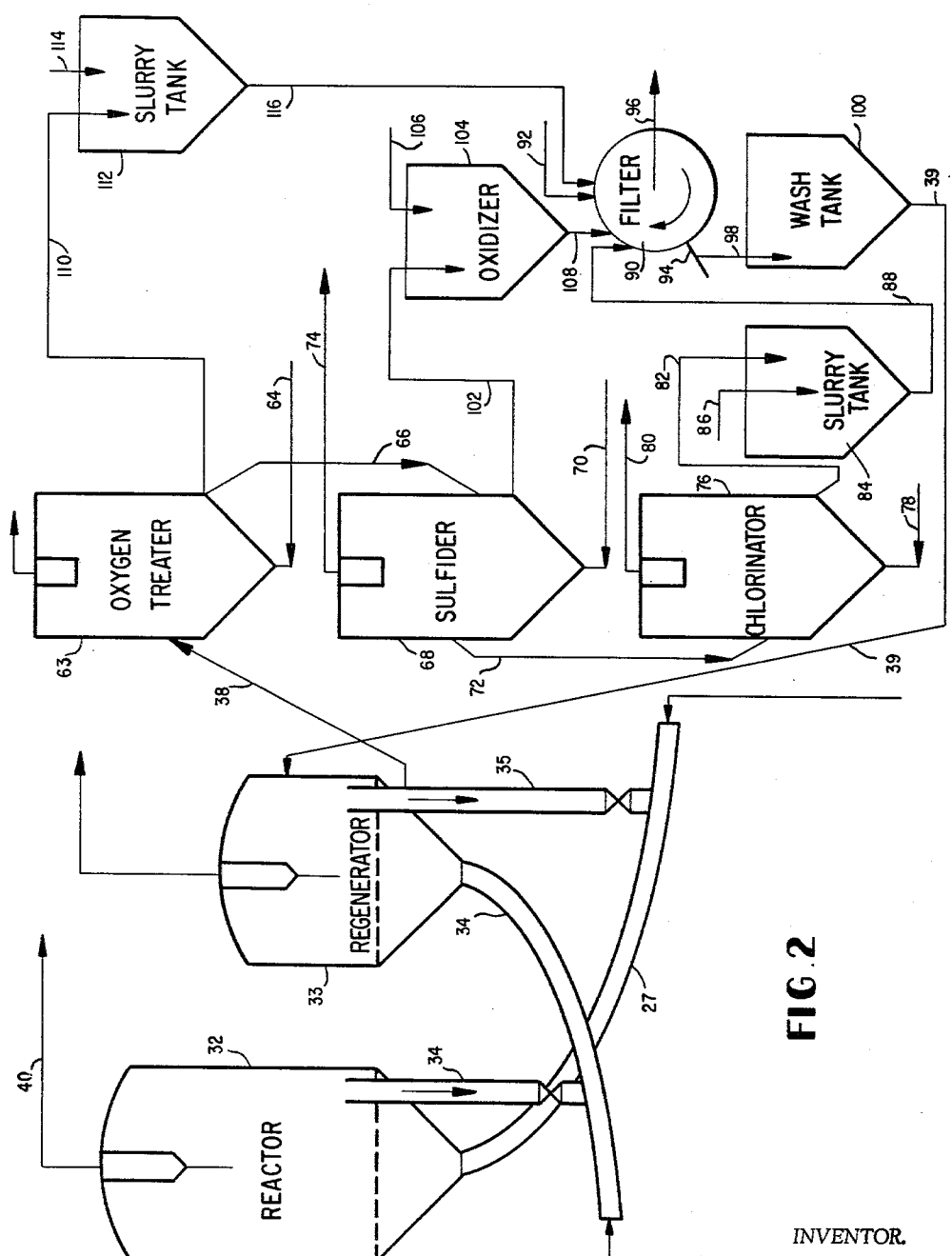

FIGURE 1 is a schematic representation of apparatus which may be employed in the process of this invention; and FIGURE 2 is a schematic representation of a fluid catalytic cracking system having associated with it components of a demetallization unit which may be used in the system of this invention.

The solvent treating process may be carried out in a conventional solvent extraction tower. Batch mixing and settling or continuous countercurrent treating operations may be employed. For instance, as represented in FIGURE 1, it is preferred to carry out the extraction process of this invention by introducing an extraction solvent such as phenol to the upper portion of treating tower 8, via line 10, to flow downwardly countercurrent to the gas oil feedstock to be treated, which is introduced near the bottom of the extraction tower via line 12. Packing elements, perforated plates, or other contacting aids can be employed in such a system. An extract phase constituting the aromatic components and most of the solvent may be removed from such a tower via line 14. A raffinate phase, comprising treated gas oil components and a little solvent is removed from the top of the tower via line 16.

The extract phase constituting the aromatic coke-formers and solvent is treated by a temperature or pressure change in separation zone 18, permitting removal of the extracting solvent via line 20 and recovery of the aromatic by-product for use as a raw material in petrochemical processes via line 23. The raffinate phase may be brought by line 16 to separation zone 25 for removal of any solvent entrained therein and then passed by line 27 to the cracking zone. Solvent may be recovered from the extract and raffinate phases by conventional techniques as described above and recycled to the extraction zone by lines 30 and 20 from the raffinate and extract separators, respectively.

The catalytic cracking system comprises the reactor 32 and regenerator 33, and is provided with lines 34 and 35 for passage of catalyst to and from the regenerator, respectively. In this invention there is also provided a demetallization unit 36 with lines 38 and 39 for passage of the catalyst to and from the demetallization unit, respectively. Cracked products leave reactor 32 by line 40 for passage to the fractionator 41, wherein these cracked products are separated as desired. The fractionator is provided with line 42 for the removal of gasoline, etc., products. The 400° F. plus boiling components may be removed by line 43 for withdrawal or for recycle to the solvent extractor by line 44 or to the reactor by lines 46 and 27.

The cracking and demetallization systems are shown in further detail in FIGURE 2. This figure shows apparatus suitable for performing the cracking, regeneration and demetallization using a fluidized solids technique. The drawing illustrates a demetallization system which includes apparatus for elevated temperature treatment with oxygen, sulfiding, chlorinating, washing and filtering the catalyst. A small slip-stream of catalyst may be withdrawn from regenerator standpipe 35, by line 38 which brings it to oxygen treater 63, where the catalyst is held at elevated temperatures in contact with air or other oxygen-containing gas from the line 64. Pipe 66 conducts the catalyst to sulfider 68. In the sulfider the catalyst is contacted as a fluidized bed with sulfiding vapors entering by line 70. Catalyst exits by line 72 and waste sulfiding gas exits by line 74. Line 72 brings the catalyst to chlorinator 76 where it is contacted by chlorinating vapor entering from line 78. Exhaust chlorinating vapor and vaporized metal poisons leave by line 80 and the catalyst, reduced in vanadium content, passes by line 82 to slurry tank 84 which is kept supplied with water, perhaps containing pH-adjusting components, from the line 86. Agitation is maintained in the slurry tank by suitable means not shown and the slurry is quickly withdrawn by line 88 to the filter 90. Although shown as a rotary drum filter, it may be of any desired type. The filter produces a catalyst cake which may be washed by water from the source 92 and scraped from the filter by doctor blade 94. Excess aqueous material is removed from the system by line 96. Catalyst goes by route 98 to wash tank 100. A slurry of catalyst in wash water may be brought by line 39 back to regenerator 33.

Alternatively the sulfided catalyst may be removed from the sulfider 68 via line 102 and conveyed to oxidizing tank 104 which is kept supplied with a liquid oxidized agent, hereinbefore described, through line 106. The sulfided catalyst is agitated with the oxidizing agent and is withdrawn by line 108 to the filter 90, where the catalyst is treated as previously described. Another alternative demetallization procedure is to remove the poisoned catalyst from oxygen treater 63 by line 110 to a slurry tank 112 where the catalyst is washed with a basic aqueous solution containing ammonium ions which is introduced via line 114. The slurry is withdrawn by line 116 and conveyed to the filter 90.

The present invention will be further described with reference to the following example which is not to be considered limiting.

A Mid-Continent deasphalted gas oil fraction boiling above 400° F. and having the following characteristics:

| | |
|---|---|
| Gravity, ° API | 22.5 |
| Viscosity, K.V./210° F., cs. | 29.4 |
| NiO, p.p.m. | 1.4 |
| $V_2O_5$, p.p.m. | 1.4 |
| Sulfur, wt. percent | 0.67 |
| Characterization factor | 12.1 | is extracted in a tower with a solvent composition comprising phenol with about 3.2% water at 25 p.s.i.g. The tower temperature is 207° F. at the bottom (extract) outlet and 209° F. at the top raffinate outlet. The solvent-to-oil ratio is 3.08/1 vol./vol. The extraction yields approximately 54.9 volume percent, based on the amount of feed used, of a gas oil product having the following characteristics:

| | |
|---|---|
| Gravity, ° API | 28.1 |
| Viscosity, K.V./210° F., cs. | 23.7 |
| Sulfur, wt. percent | 0.28 |
| Characterization factor | 12.5 |

This gas oil, containing 1.0 p.p.m. nickel and 0.8 p.p.m. vanadium, reported as common oxides, is passed to a fluid catalytic cracking unit where because of its lower aromaticity as a result of the phenol treat it produces more gasoline and less coke. Similar results are obtained when sulfur dioxide or furfural is used as the solvent.

It was determined that a metals level of 300 p.p.m. NiO was the tolerance at the cracking unit for economic processing of the dearomatized gas oil. About 10% of the cracking catalyst inventory is each day sent as a side stream from the regenerator to demetallization. The catalyst at equilibrium metals level contains about 300 p.p.m. nickel oxide and 570 p.p.m. $V_2O_5$ and is regenerated to about 0.4% carbon. After regeneration, the catalyst is held in air for about an hour at about 1300° F. and then sent to a sulfiding zone where it is fluidized with $H_2S$ gas at a temperature of about 1150° F. for about 1½ hours. The catalyst is cooled and purged with inert gas and chlorinated with an approximately equimolar mixture of $Cl_2$ and $CCl_4$ at about 600° F. After about one hour no trace of vanadium chloride can be found in the chlorination effluent and the catalyst is quickly washed with water. A pH of about 3 is imparted to this wash medium by chlorine contained in the catalyst and the wash serves to remove nickel chloride. The catalyst, with 20% of its vanadium and 70% of its nickel removed, is filtered from the wash slurry, dried at about 350° F. and returned to the regenerator.

It is claimed:

1. A process for treating a hydrocarbon feedstock boiling above the gasoline range containing aromatic hydrocarbons and at least about 0.3 p.p.m. nickel and at least about 1.2 p.p.m. vanadium metal contaminants which comprises contacting said hydrocarbon oil in a dearomatizing zone with a selective solvent to form a dearomatized oil raffinate phase containing at least 1.0 p.p.m. of said contaminating metal and an aromatic extract phase, subjecting said dearomatized oil phase to catalytic cracking, regenerating the catalyst to remove carbon, removing a portion of metal contaminated catalyst from the cracking system and demetallizing removed catalyst, returning demetallized catalyst to said cracking system, and recovering the gasoline from said cracking, said metal contents being calculated as the metal oxides.

2. The process of claim 1 wherein the cracking catalyst is a synthetic gel silica-based cracking catalyst.

3. The process of claim 1 in which demetallizing includes contact of the catalyst with a vapor reactive with a metal contaminant.

4. The process of claim 1 wherein the catalyst subjected to demetallization contains at least about 200 p.p.m. nickel and at least about 500 p.p.m. vanadium and at least 50% of the nickel and at least 15% of the vanadium are removed during demetallization.

5. The process of claim 2 wherein the dearomatized raffinate contains about 0.3 to 3 p.p.m. nickel and about 0.8 to 5 p.p.m. vanadium and the catalyst subjected to demetallization contains at least about 200 p.p.m. nickel and at least about 500 p.p.m. vanadium and at least 50% of the nickel and at least 15% of the vanadium are removed during demetallization.

6. The process of claim 5 wherein the catalyst is silica-alumina.

7. The process of claim 6 wherein demetallization is accomplished by contacting the regenerated catalyst with a molecular oxygen-containing gas at a temperature of about 1000 to 1800° F. to enhance subsequent vanadium removal, sulfiding the poisoning metal-containing component on the catalyst by contact with a sulfiding agent at a temperature of about 500–1500° F. to enhance subsequent nickel removal, chlorinating poisoning metal containing component on the sulfided catalyst by contact with an essentially anhydrous chlorinating agent at a temperature of about 300–1000° F. and contacting the chlorinating agent-treated catalyst with a liquid, essentially aqueous medium to remove soluble metal components from the catalyst.

8. The process of claim 7 wherein the selective solvent is selected from a group consisting of liquid sulfur dioxide, furfural and phenol.

References Cited in the file of this patent
UNITED STATES PATENTS

| | | |
|---|---|---|
| 2,758,097 | Doherty et al. | Aug. 7, 1956 |
| 2,875,149 | Beavon | Feb. 24, 1959 |
| 2,906,693 | Donaldson | Sept. 29, 1959 |
| 3,053,759 | Harvey | Sept. 11, 1962 |